Nov. 25, 1924.

O. PILLAR

PORTING MACHINE

Filed April 5, 1922    2 Sheets-Sheet 1

1,516,751

Inventor
OSCAR PILLAR

Harry C. Schuck
Attorney

Nov. 25, 1924.
O. PILLAR
1,516,751
PORTING MACHINE
Filed April 5, 1922    2 Sheets-Sheet 2
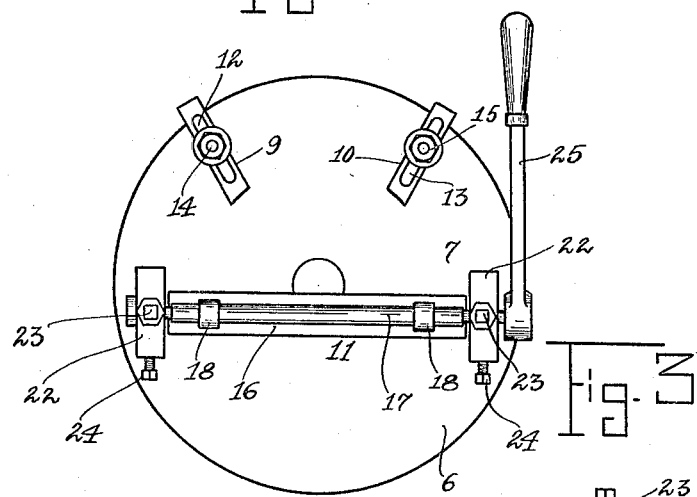
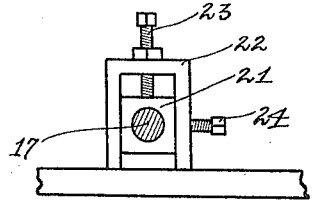
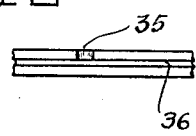
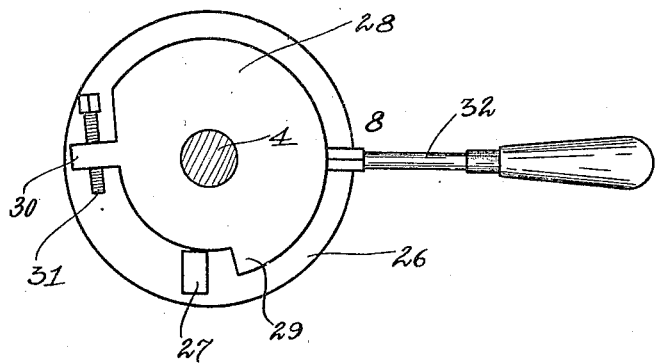
Inventor
OSCAR PILLAR
Harry C Schrode
Attorney Patented Nov. 25, 1924.

1,516,751

UNITED STATES PATENT OFFICE.

OSCAR PILLAR, OF OAKLAND, CALIFORNIA, ASSIGNOR TO VACUUM GROOVE PISTON RING CORPORATION, OF OAKLAND, CALIFORNIA, A CORPORATION OF CALIFORNIA.

PORTING MACHINE.

Application filed April 5, 1922. Serial No. 549,954.

*To all whom it may concern:*

Be it known that I, OSCAR PILLAR, a citizen of the United States, residing at Oakland, in the county of Alameda and State of California, have invented certain new and useful Improvements in Porting Machines, of which the following is a specification.

My invention is a porting machine, and more particularly a machine for cutting ports in the face of piston packing rings from one edge of the ring to the annular groove in the face of the ring through which ports oil enters the piston groove to form an oil seal between the ring and cylinder wall.

My porting machine is simple in construction and accurate, rapid and efficient in operation.

Referring to the annexed drawing in which my invention is illustrated and which forms a part of this specification:

Figure 2 is a plan view of the chuck for holding the piston ring.

Figure 3 is a side view of one of the adjustable chuck clamp bearings and bearing supports.

Figure 4 is a plan view of the chuck adjusting device.

Figure 5 is a fragmentary side view of a piston ring.

Figure 1:
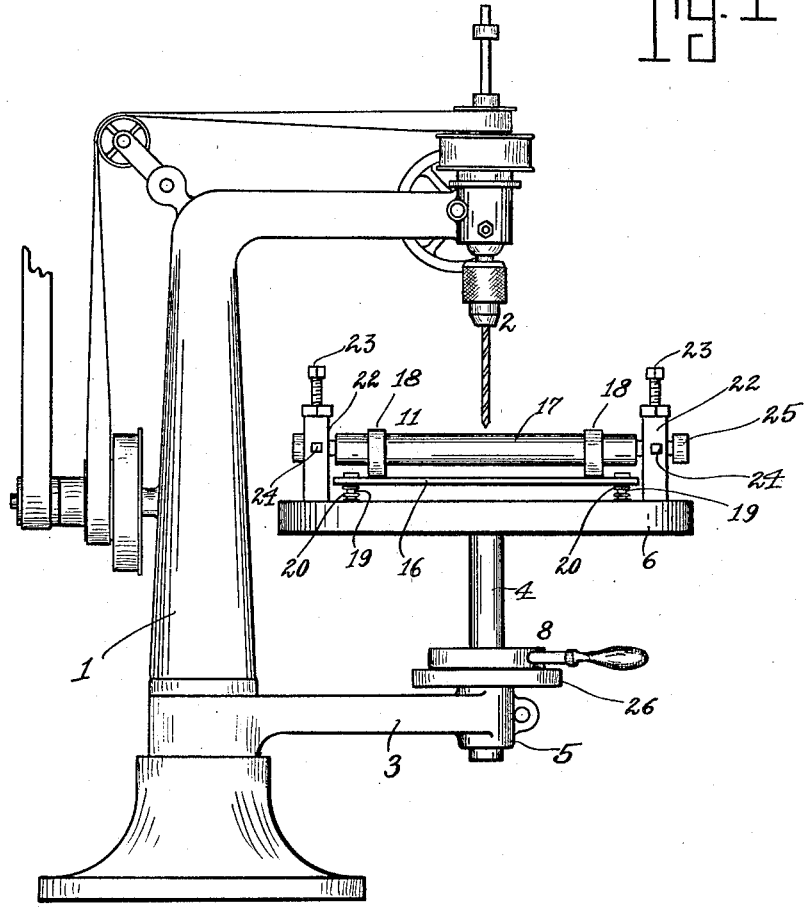
Figure 1 is a side elevation of a drill press embodying my invention.

In the drawing 1 indicates a standard, 2 a drill mounted in the upper end of said standard, 3 an arm mounted on the lower part of said standard, 4 a vertical shaft journaled in a bearing 5 on the end of said arm, and 6 a work holding table secured on the upper end of said shaft, said structure constituting a standard drill press.

My invention comprises a piston packing ring chuck 7 mounted on the table 6 and a chuck adjusting device 8. The chuck 7 includes a pair of adjustable positioning jaws 9 and 10 for positioning the piston ring on the table, and a clamp 11 for clamping the ring positioned on said table by said jaws. The jaws 9 and 10 are provided respectively with longitudinal slots 12 and 13 and are spaced apart and secured to the table 6 at one side thereof by bolts 14 and 15 respectively which extend through said slots and are seated in said table. The clamp 11 comprises a clamp bar 16 extending over the table 6 near the center thereof opposite jaws 9 and 10, a clamp shaft 17 and a pair of cams 18—18 secured on said shaft. Bar 16 is slidably mounted on vertical bolts 19—19 seated in the table 6 and on springs 20—20 which surround said bolts and normally hold the bar in its uppermost position against the heads of said bolts on the upper ends thereof. The shaft 17 is journaled at its ends above plate 16 in bearings 21—21 mounted to be adjusted vertically in bearing frames 22—22 secured on the table 6. Set screws 23—23 are seated in the upper part of frames 22—22 for adjusting and limiting the height of bearings 21—21 and shaft 17 and set screws 24—24 are seated in one side of bearing frames 22—22 for engaging one side of said bearings to hold them and shaft 17 up in their adjusted position. A handle 25 is secured on one end of shaft 17 for turning the shaft and cams 18—18 so that said cams will engage clamp plate 16 and force the plate down into engagement with the piston ring positioned on the table 6 by jaws 9 and 10 whereby the ring is clamped in position by the chuck 7. The chuck adjusting device 8 comprises a fixed disk 26 secured on the upper end of bearing 5 through which shaft 4 loosely extends. A stop 27 is provided on the upper side of said disk. A collar 28 is secured on said shaft and rests on said disk, on which is formed a shoulder 29 and a lug 30 in which lug is seated a set screw 31. A handle 32 is secured to collar 28 for turning it together with the shaft 4, table 6 and chuck 7. The collar 28 resting on the disk 26 sustains the table 6 and chuck 7. The shaft 4 is positioned on the arm 3 so that the chuck 7 holds the piston ring in such position that the drill 2 may be lowered to cut a port 35 in the face of the piston ring above the clamp plate 16 from the upper edge of the ring to the annular groove 36 in the face of the ring. By turning the collar 28, shaft 4, table 6 and chuck 7 so that the shoulder 29 or set screw 31 engages the stop 27 the piston ring may be adjusted so that the drill will cut the port 35 in the face of the ring anywhere within a distance of substantially 90°.

Having described my invention, I claim:

1. In combination with a work table and drill of a drill press, a chuck mounted on said work table for holding a piston ring in position to enable the drill to drill ports in the face of the piston ring, said chuck comprising a pair of jaws secured on said work table for engaging the face of the piston ring and a clamp, said clamp comprising a clamp plate, bolts extending through the ends of said clamp plate and seated in said work table on which bolts said plate is slidably mounted, springs surrounding said bolts between said work table and said plate for normally holding said plate in its upper position above the piston ring, a clamp shaft, bearings mounted upon said work table in which said shaft is journaled, and cams on said shaft for engaging said clamp plate when the shaft is turned to press said plate down into clamping engagement with the piston ring.

2. In combination with a work table and drill of a drill press, a chuck mounted on said work table for holding a piston ring in position to enable the drill to drill ports in the face of the piston ring, said chuck comprising a pair of jaws secured on said work table for engaging the face of the piston ring and a clamp, said clamp comprising a clamp plate, bolts extending through the ends of said clamp plate and seated in said work table on which bolts said plate is slidably mounted, springs surrounding said bolts between said work table and said plate for normally holding said plate in its upper position above the piston ring, a clamp shaft, vertically adjustable bearings mounted upon said work table in which said shaft is journaled, and cams on said shaft for engaging said clamp plate when the shaft is turned to press said plate down into clamping engagement with said piston ring.

3. In combination with a standard, a drill mounted in the upper part of said standard, an arm on said standard, a work table shaft journaled in a bearing on said arm, and a work table secured on the upper end of said shaft, a piston ring chuck mounted on said work table, a disk secured on said arm above said bearing through which said shaft extends, a stop on said disk, a collar secured on said shaft and resting on said disk to sustain said work table, a shoulder and a set screw on said disk for engaging said stop to limit the movement of said work table, chuck and piston ring so that said drill will drill a port in the face of said piston ring anywhere within the range of movement of the table.

4. In a machine of the character set forth, the combination of a supporting member, a fixed plate on the supporting member, a lug on the fixed plate, a rotatable member supported by the fixed plate, stops on the rotatable member co-operating with the lug of the fixed plate so as to limit the movement of rotation of the rotatable member and means for rotating the rotatable member.

5. In a machine of the character set forth, the combination of a supporting member, a fixed plate on the supporting member, a lug on the fixed plate, a rotatable member supported by the fixed plate, stops on the rotatable member co-operating with the lug of the fixed plate so as to limit the movement of rotation of the rotatable member, one of said stops being adjustable so as to vary the extent of rotation of the rotatable member and means for rotating the rotatable member.

In testimony whereof I affix my signature.

OSCAR PILLAR.